United States Patent
Blum

(10) Patent No.: US 9,317,932 B2
(45) Date of Patent: Apr. 19, 2016

(54) METHOD AND APPARATUS FOR MEDICAL DATA COMPRESSION FOR DATA PROCESSING IN A CLOUD SYSTEM

(71) Applicant: Thomas Blum, Neunkirchen am Brand (DE)

(72) Inventor: Thomas Blum, Neunkirchen am Brand (DE)

(73) Assignee: Siemens Aktiengesellschaft, Munich (DE)

( * ) Notice: Subject to any disclaimer, the term of this patent is extended or adjusted under 35 U.S.C. 154(b) by 265 days.

(21) Appl. No.: 13/853,224

(22) Filed: Mar. 29, 2013

(65) Prior Publication Data

US 2013/0259348 A1    Oct. 3, 2013

(30) Foreign Application Priority Data

Mar. 30, 2012 (DE) .................... 10 2012 205 273

(51) Int. Cl.
| | |
|---|---|
| G06K 9/00 | (2006.01) |
| G06T 9/00 | (2006.01) |
| H04N 19/60 | (2014.01) |
| H04N 19/30 | (2014.01) |

(52) U.S. Cl.
CPC ........ *G06T 9/00* (2013.01); *H04N 19/30* (2014.11); *H04N 19/60* (2014.11)

(58) Field of Classification Search
None
See application file for complete search history.

(56) References Cited

U.S. PATENT DOCUMENTS

| | | | | |
|---|---|---|---|---|
| 5,710,835 A * | 1/1998 | Bradley | ............... | H04N 19/63 375/240.08 |
| 5,905,821 A | 5/1999 | Nonoshita et al. | | |
| 6,212,301 B1 | 4/2001 | Warner et al. | | |
| 6,553,141 B1 * | 4/2003 | Huffman | ........... | H04N 21/6377 375/E7.016 |
| 7,006,696 B2 * | 2/2006 | Huffman | ........... | H04N 21/6377 375/E7.016 |
| 7,280,702 B2 * | 10/2007 | Chang | ....................... | G06T 1/00 375/E7.065 |
| 8,145,001 B2 * | 3/2012 | Khorasani | ............ | G06F 19/321 382/232 |
| 2003/0005464 A1 * | 1/2003 | Gropper et al. | ............... | 725/115 |
| 2004/0073873 A1 * | 4/2004 | Croney | ................. | G06T 3/4092 715/273 |
| 2006/0005031 A1 * | 1/2006 | Apostolopoulos | ........... | 713/179 |
| 2008/0037880 A1 | 2/2008 | Lai | | |
| 2009/0129643 A1 * | 5/2009 | Natanzon | ............. | G06F 19/321 382/128 |

(Continued)

OTHER PUBLICATIONS

Foos et al. "JPEG 2000 compression of medical imagery", Feb. 2000, Proc. of SPIE vol. 3980, PACS Design and Evaluation: Engineering and Clinical Issues, ed. G. Blaine, E. Siegel, pp. 85-96.*
Doukas et al., "Mobile Healthcare Information Management utilizing Cloud Computing and Android OS", Sep. 4, 2010, IEEE, pp. 1037-1104.*

(Continued)

*Primary Examiner* — Jason Heidemann
(74) *Attorney, Agent, or Firm* — Schiff Hardin LLP

(57) ABSTRACT

In a method and a system for processing medical image data in a cloud system, image data acquired at a modality are compressed via an incremental compression and transferred in compressed form to a decompressor of the cloud system. The decompressor relays the decompression result to different processing units for incremental processor in order to provide a result that is then relayed to the modality and/or to additional computer-based instances.

11 Claims, 2 Drawing Sheets

(56) References Cited

U.S. PATENT DOCUMENTS

| | | | | |
|---|---|---|---|---|
| 2010/0299157 | A1* | 11/2010 | Fram et al. | 705/3 |
| 2011/0044534 | A1* | 2/2011 | Dewan et al. | 382/159 |
| 2011/0081065 | A1 | 4/2011 | Canstein | |
| 2011/0110568 | A1* | 5/2011 | Vesper et al. | 382/128 |
| 2011/0206249 | A1* | 8/2011 | Mathew | 382/128 |
| 2011/0243407 | A1* | 10/2011 | Sofka | G06F 19/321 382/128 |
| 2012/0221346 | A1* | 8/2012 | Acker | G06F 19/321 705/2 |
| 2013/0110537 | A1* | 5/2013 | Smith | G06Q 10/06 705/2 |
| 2013/0185331 | A1* | 7/2013 | Conemac | G06F 19/321 707/783 |
| 2013/0208955 | A1* | 8/2013 | Zhao | G06F 19/321 382/128 |
| 2013/0208966 | A1* | 8/2013 | Zhao | G06F 9/5072 382/131 |

OTHER PUBLICATIONS

Przelaskowski, "The JPEG2000 Standard for Medical Image Applications", 2004, Task Quarterly 8 No. 2, 147-158.*

Usevitch, "A Tutorial on Modern Lossy Wavelet Image Compression: Foundations of JPEG 2000," Signal Processing Magazine, IEEE, vol. 18 No. 5 pp. 22-35 (2001).

Pinho et al., "Progressive Lossless Compression of Medical Images," Acoustics, Speech and Signal Processing, 2009 ICASSP IEEE Conference pp. 409-412.

Martin, Uwe-Erik, "Der JPEG2000 Standard," Siemens AG, Medical Solutions, pp. 1-40 (2004).

Skodras et al., "The JPEG 2000 Still Image Compression Standard," IEEE Signal Processing Magazine, vol. 18, No. 5, pp. 36-58 (2001).

Taubman, "High Performance Scalable Image Compression with EBCOT," IEEE Transactions on Image Processing, vol. 9, No. 7, pp. 1158-1170 (2000).

* cited by examiner

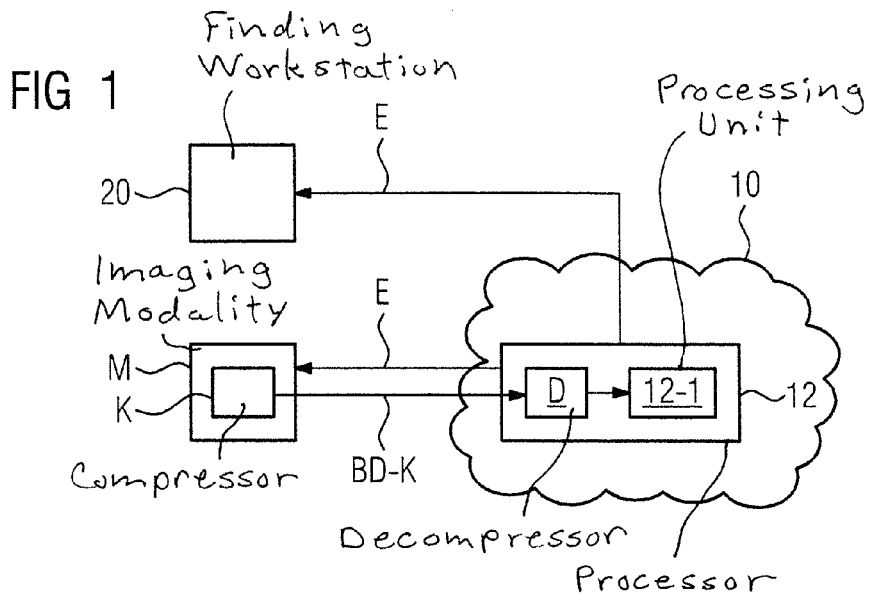
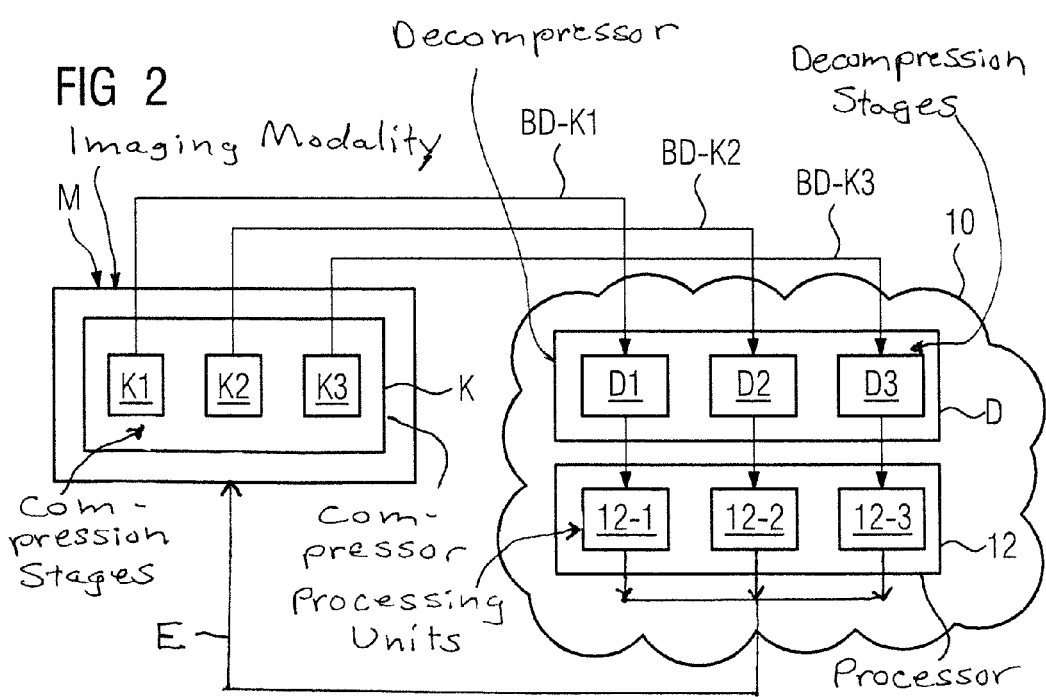

METHOD AND APPARATUS FOR MEDICAL DATA COMPRESSION FOR DATA PROCESSING IN A CLOUD SYSTEM

BACKGROUND OF THE INVENTION

1. Field of the Invention

The present invention is in the field of information technology and concerns cloud processing of medical data sets.

2. Description of the Prior Art

Particularly in the field of medical technology (radiology, for example) there are numerous use cases in which resource-intensive and memory-intensive image processing processes are outsourced to a cloud system. Since high-volume data sets are processed and/or transferred, particularly in the field of radiology, the available bandwidth is a constraint or constriction of the amount per time of data that can be transferred, and is thus known as a "bottleneck". The advantage of the computing power and/or storage capacity provided by the cloud system cannot be used—or can be used only to a limited extent—when the transfer times for data exchange between the participating applications or clients and the cloud system are too high. For example, if a physician would like to deliberately process the radiological image data set to be assessed via a cloud system, but must wait too long for the result, the physician will not use this service in the future or will use this service only to a very limited extent.

In order to overcome this disadvantage, in the prior art it is known to avoid public networks or networks with too little bandwidth, and to integrate local cloud solutions—known as private clouds—directly into the application system (thus into radiology in the above example). The internal bandwidth of the network that is used can then be adapted upward. A significant disadvantage of such private cloud systems however, is that the actual advantages of a public cloud (for example nearly unlimited scalability) cannot be used, or can be used only to a limited extent. Furthermore, it is often not possible to install additional, faster data connections within an organization (hospital, for example). Even if a new installation of network connections should be possible, this is disadvantageously associated with high costs.

Therefore, an additional known approach in the prior art is to not shift data-intensive processing algorithms and processes into the cloud, but rather to execute them at internal, locally present computer systems that have been set up for this purpose with regard to storage capacity and computing power. This is also associated with economic disadvantages.

However, if the user of current systems would prefer not to forego the advantages of cloud computing, the internal and external network connections to the cloud and from the cloud are the "chokepoint" that leads to long transfer times.

Furthermore, in the prior art it is known to use compression methods in order to transfer data in compressed form (see for example JPEG2000 or progressive JPEG, or compression formats such as ZIP or the like). However, these systems can disadvantageously be applied only to a limited extent to the computer-based data formats that are currently in use in medical technology—in particular in radiology (DICOM format)—due to the disadvantages that are connected with these formats. Data that are transferred into the cloud have thus previously been compressed at the sender with known compression methods (ZIP, for example) and decompressed at the receiver before they are supplied to the cloud computer together with the algorithm to be used for processing the data. This leads to a significant time delay at the sender and at the receiver.

SUMMARY OF THE INVENTION

An object of the present invention is to overcome the aforementioned disadvantages and to improve the processing of radiological data, in particular for the purposes of assessment or for diagnostic processes.

In the following, the invention is described with reference to the method. Advantages, features and alternative embodiments that are mentioned likewise apply to the system and the compressor and the decompressor that are also within the scope of the invention. The functional features of the method are fashioned as suitable hardware modules or microprocessor units that are designed to implement the respective functionality. For example, the method step of compression is achieved by the hardware module of a compressor that is equipped with the described compression functionality.

The method according to the invention is for processing medical image data within the scope of a diagnostic process, the image data having been acquired at an imaging modality, and the modality acts as a data source. The image data are transferred to a cloud system for processing. The method includes the following steps:

incremental compression of the image data, incremental transfer of the image data in compressed form from the data source to the cloud system, incremental decompression of the image data into the cloud system, processing of the decompressed image data in at least one processing unit of the cloud system, and transfer of a processing result to the data source and/or to at least one additional computer-based instance.

The terms used within the scope of invention are explained in detail in the following.

The medical image data can be radiological image data—for example two-dimensional, three-dimensional image data—that have been acquired by an x-ray apparatus. Alternatively, they can be higher-dimensional exposures (for example image sequences of an ultrasound examination). The image data are typically provided in a defined format, in particular in the DICOM format (DICOM: Digital Information And Communications In Medicine). Alternatively, the data can be provided and/or processed or stored in an HL7 protocol, a SOAP protocol (SOAP—Simple Object Access Protocol) or in other formats. The modality used for image acquisition is in principle not limited to a specific type, and includes x-ray apparatuses, magnetic resonance tomography systems, ultrasound apparatuses, PET systems and additional imaging devices.

The cloud system serves to process the data. According to one embodiment of the invention, it is a computer-based infrastructure in order to provide computing capacity, storage capacity and expanded functionalities. For example, it can be an IaaS system (IaaS: Infrastructure as a Service), a PaaS system (PaaS: Platform as a Service) and/or a SaaS system (SaaS: Software as a Service). Naturally, the service models described above can also be provided in combination. Depending on the setup of the cloud, the cloud can be, according to a first aspect, an infrastructure, or a platform according to a second aspect and provide applications according to a third aspect. According to a preferred embodiment, the cloud is designed as a public cloud so that the provided services are made available to an unlimited amount of users. Preferred application cases provide a private cloud or a combination of private and public cloud (known as a hybrid cloud).

The incremental compression is based on different compression levels, wherein a compression level is accompanied by a defined degree of quality. In principle, the degree of compression and the degree of quality have an inverse proportional relationship. Known compression methods—for example JPEG methods, progressive JPEG methods or the like—are advantageously used for the compression. The number of levels can be configured in advance. Three levels are preferably provided. The respective compression method that is used is associated with a respective decompression method in the cloud.

The image data are processed in the cloud by provided processing units. Depending on the type of service that is requested, the processing can be executed at a processing unit or can be distributed to multiple processing units. For example, the processing unit can be a single processor or a multi-chip module (MCM module). The processing can likewise be an incremental processing, wherein the levels of compression and decompression correspond.

According to an embodiment of the invention, the number of processing units corresponds to the number of compression levels. This has the advantage that every compression stage can relay the decompressed image data to the respectively associated processing unit for processing immediately after decompression of the image data, in order to be able to provide the result as quickly as possible. Alternatively, other associations can be provided so that—for example—multiple processing units are associated with one compression stage, or the result of multiple compression stages is executed by one processing unit.

The cloud system is typically not only engaged in data exchange with the data source, but also additional computer-based entities are connected to the cloud system. The computer-based entities can be application servers and/or clients. For example, an image finding software (for example "Syngo.via" from Siemens AG) can be hosted on the server, while a finding workstation is implemented at the client. The number of connected modalities, servers and/or clients thus is not limited.

Different processing units can likewise be implemented in the cloud system. For example, these can be a segmentation unit a localization unit, CAD units (CAD: Computer-Aided Diagnosis), etc.

According to a preferred embodiment, the compressed image data are transferred sequentially to the cloud system. "Sequentially" in this context means that the individual compression levels are transferred separately and in succession. The first compression level—which has a high degree of compression and a low quality—has the shortest transfer time, while the third or n-th level has the lowest degree of compression (at the highest quality) and is transferred fastest to the cloud system. As soon as the compression result is available, it is transferred to the cloud system and processed further there. According to one aspect of the invention, the individual compression levels are transferred to respective individual processing units, but this is not absolutely necessary, and it is alternatively possible to supply the compression levels to a common processing unit.

According to a further embodiment, the compressed image data are transferred in parallel to the cloud system. According to a first aspect, "parallel" refers to the fact that the image data compressed in different levels are also transferred to the cloud system in different data packets. According to a second aspect, the term "parallel" refers to the fact that the compressed image data levels are transferred in parallel to the cloud via different network connections. The term "network connection" includes logical and physical network connections.

As already described above, in a preferred embodiment the number of compression levels or decompression levels corresponds to the number of processing units. For example, this has the advantage that image processing processes or algorithms are associated with specific processing units (and thus can be grouped) that each require a coinciding quality of the image data. For example, it is thus possible to execute a segmentation of image data based on image data at relatively low image quality, while other image processing tasks (for instance the determination of tumor tissue) require a high image quality. The processing services provided in the cloud are thus classified. Depending on what image quality they require that can be considered (as input parameters), they are associated with different processing units. It can therefore advantageously be achieved that a complete result can already be provided at an earlier point in time.

In a further embodiment of the invention, the compression takes place losslessly. Alternatively, a lossy compression can be set. The selection of the compression type (lossless/lossy and the selection of the compression algorithm) can be configured in advance. The method thus can be flexibly adapted to different use situations.

According to a further aspect, the compression is dynamically adapted to the respective network properties of the network that is used. The network connections—in particular the available bandwidth—are measured for this purpose. The selection of the compression level or the number of compression levels can then be dynamically adapted using the measured network connection properties. A better processing result thus can be achieved overall because the currently available network properties are taken into account in the data transfer and processing in the cloud.

According to a further aspect, the data format in which the processing result is provided can be configured. The format can coincide with the data format in which the image data are provided and/or processed (DICOM, for example), or can be different from the data format than the compressed and subsequently decompressed image data. The processing result can be provided in the form of a list structure. The processing result includes text data, and possibly image section data, and therefore data that have a relatively low volume in comparison to the image data. According to a preferred embodiment of the invention, the image data are transferred as raw data to the cloud and are transformed into images (for example according to the DICOM standard) using known reconstruction methods in the cloud.

According to a first embodiment, the processing result is relayed to further computer-based instances in uncompressed form. According to a further embodiment, the processing result is likewise compressed and relayed in compressed form to further computer-based instances.

The processing result can be relayed to other processing instances that do not necessarily need to coincide with the data source, for example a finding workstation that—under the circumstances—is connected to the cloud via a corresponding server.

The above object also is achieved in accordance with the invention by a system to process medical (in particular radiological) image data within the scope of a diagnostic process that includes:

at least one imaging modality that acts as a data source, and at which the medical image data are acquired, a cloud system that serves to provide services, that includes:

at least one processing unit that serves to process the decompressed image data and to provide a processing result, and to relay the processing result to the data source and/or to at least one additional computer-based instance, a network via which the data source and the cloud system (and optionally also additional computer-based instances) are engaged in data exchange, a compressor that is designed for incremental compression of the image data, wherein the compressor is advantageously associated with the modality, a decompressor that is designed for incremental decompression of the compressed image data in the cloud system.

The compressor is preferably provided directly to the modality as a separate compression unit. Alternatively, the compressor can be designed as a software module, and, for example, can be optionally activated as a plug-in of the modality.

The above object also is achieved in accordance with the invention by a compressor that is designed for use in the system described above, and by a decompressor that is likewise designed for use in the system described above.

BRIEF DESCRIPTION OF THE DRAWINGS

FIG. 1 schematically illustrates computer-based entities for processing medical image data in a cloud system according to a preferred embodiment of the invention.

FIG. 2 is a more detailed schematic representation of a processing system according to the invention.

DESCRIPTION OF THE PREFERRED EMBODIMENTS

Figure 3:
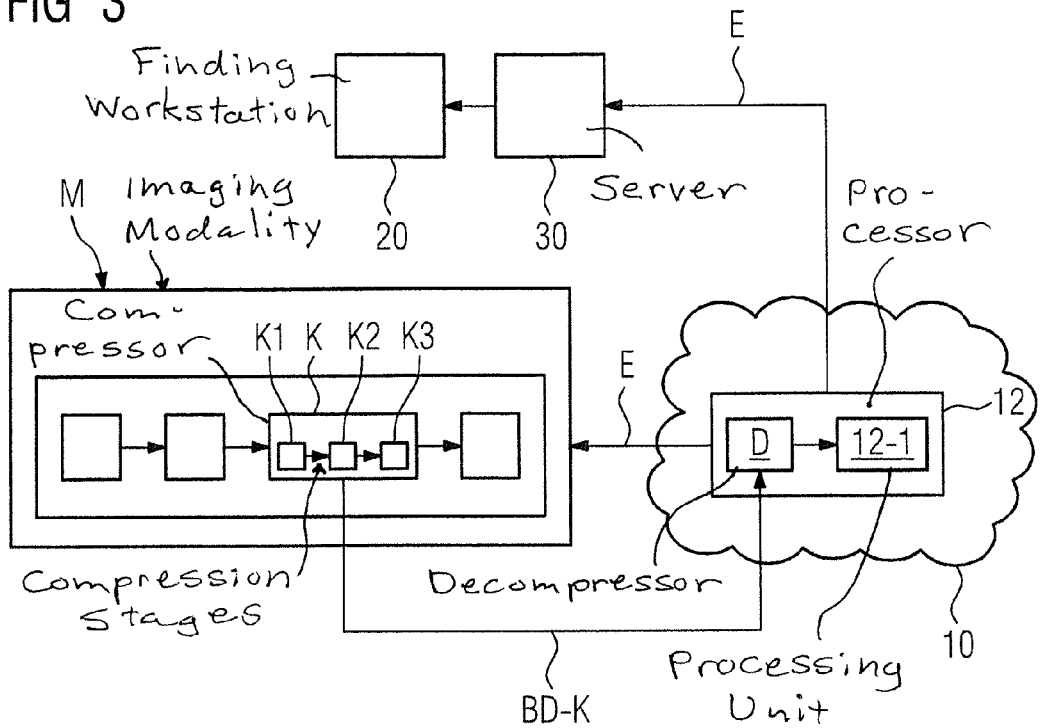
FIG. 3 is a schematic illustration of the system of the invention, according to a preferred embodiment.

The present invention is explained in detail using an exemplary embodiment with reference to FIG. 1. The invention concerns a method to process medical image data BD, for example x-ray images, ultrasound exposures, PET exposures etc. Within the scope of a diagnostic process, the acquired image data must be subjected to additional image processing procedures in order to be able to provide a result. In order to be able to provide sufficient storage and processing capacity, the processing is executed in a cloud system 10 that is shown on the right side in FIG. 1. The cloud system 10 has at least one processor 12 that is designed to process the decompressed image data in the cloud. The processor 12 can in turn include separate processing instances, one of which is shown in FIG. 1 as a processing unit 12-1. The individual processing units serve for image processing and can access CAD algorithms (for example) that are respectively implemented at the processing units such as 12-1.

As shown in FIG. 1, it is provided that the medical images that have been acquired at the imaging modality M are initially supplied to a compressor K. In this exemplary embodiment, the compressor K is directly implemented at the modality M. Alternatively, it can be connected to the modality as a separate instance. The compressor serves to compress the acquired image data in different compression levels. The result of the compression is compressed image data BD-K that are then relayed to the cloud system 10 for additional processing. The compressed image data BD-K are supplied to a decompressor D in order to generate decompressed image data that are then supplied to a processing unit 12-1 for processing in order to provide a processing result E. In the embodiment shown in FIG. 1, the processing result E is relayed both to the modality M and to an additional computer-based instance (in this case to a finding workstation 20). An algorithm for localization of malignant tissue is implemented at the processing unit 12-1. The result E is thus assessed cancer areas that are relayed either as image section or in the form of text data (for example liver tumor, prostate carcinoma etc.) to the finding workstation 20, or to additional computer-based instances.

The image data BD are advantageously x-ray images, MRT images and/or PET images. It is obvious to those skilled in the art that images from other modalities can naturally also be processed with the presented method. However, other data formats—for example measurement results of physiological examinations (for example temperature, oxygen saturation or additional laboratory values etc.)—can alternatively also be included. The compressed image data BD-K transmitted from the modality are initially supplied to the compressor K for decompression before they are passed to the image processing algorithm in the processing unit 12-1. In the normal case, the results E comprise relatively small-volume data sets that typically do not need to be compressed separately, but rather can be relayed directly to the respective receiver. As was already mentioned in the preceding, image data sets (and therefore rather high-volume data sets) can also be provided and/or transferred.

FIG. 2 shows a further exemplary embodiment in which the incremental compression of the image data BD is explained in detail. As is shown in FIG. 2, the modality M includes a compressor K that includes different compression stages that are represented in FIG. 2 with reference characters K1, K2, K3. In this example, a three-level compression method is provided. Each compression stage K1, K2, K3 generates a separate compression result in the form of compressed image data BD-K1, BD-K2 and BD-K3, that is separately transferred to the cloud system 10. At the cloud system 10, the decompressor D again has a coinciding number of decompression stages (that are labeled D1, D2, D3 in FIG. 2). After transfer of the compressed image data in the different compression levels, the compressed data are supplied to the individual decompression stages D1, D2, D3 of the decompressor D of the cloud system 10 in order to calculate the image data in different quality levels. The respective decompression results are in turn supplied to the processing units 12-1, 12-2, 12-3. As is shown in FIG. 2, the number of compression or decompression stages corresponds to the number of processing units 12. After processing via the processing units 12-1, 12-2, 12-3, the result E is sent back to the modality M. In a first transfer step, the image data BD-K1 are transferred in a highly compressed state (and thus with lower quality) to the cloud system 10 and to the decompressor D. Although the quality of the data decreases due to the high compression rate, the transfer time between modality M and cloud system 10 can likewise be markedly reduced since the data set to be transferred is reduced in size. The compressed image data of the first compression stage BD-K1 are supplied to the corresponding first decompression stage D1 of the decompressor D in the cloud system 10. An image at lower quality can then be calculated from BD-K1, which image is directly passed to an image processing algorithm that is implemented at the first processing unit 12-1. The first processing unit 12-1 (with a segmentation function, for example) can create a first result suggestion (low quality) using the qualitatively low-grade data. In parallel with this, less highly compressed image data BD-K2 from the compression stage K2 are transferred to the cloud system 10 in a second transfer step, and then are supplied to the second decompression stage D2 of the decompressor D in order to provide image data in an improved quality relative to the image data from D1. These image data of D2 are then supplied (possibly together with the first result suggestion of the first (de-) compression stage) to the processing unit 12-2 for calculation in order to generate an additional suggestion result. The first suggestion result serves as a start point for the further processing units or, respectively, the algorithms implemented from these in order to be able to execute additional calculations on the original image data. For example, what is known as a SEED point from the preceding compression stages can be used. In the third step, the image data BD-K3 from the third compression stage are then transferred to the cloud system 10. The image data BD-K3 are supplied to the third decompression stage D3, which then relays its result to the third processing unit 12-3 in order to calculate a third result suggestion.

The result contributions can then be consolidated into a complete result E that is then relayed to the modality M and/or to additional computer-based instances such as the workstation 20.

An important advantage of the present invention is that the number of compression stages or decompression stages and/or the number of processing units of the processor 12 are configurable. Furthermore, the number of decompression stages/compression stages and/or the processing units of the processor 12 can be adjusted depending on the currently present network bandwidth. The transfer method thus can be very efficiently designed or configured for the currently available network capacity.

In further exemplary embodiments, even fewer or more compression stages can naturally be taken into account.

An important advantage is apparent in that the image processing processes are based on image data at different quality levels. For example, a segmentation of an organ (for example the liver) is possible at relatively low image quality, while a tumor localization requires image data at high quality. All image processing instances that can already be executed given image data at relatively low image quality can thus be brought forward and be combined into the processor 12. A reduction of the data transfer times and an optimization of the total result E is therefore possible.

FIG. 3 shows an additional exemplary embodiment in which the image data are again compressed in different steps and are relayed at different compression levels to the cloud system 10. The compressed image data that are received there are in turn incrementally decompressed and supplied to individual processing units of the processor 12 (only one of which, processing unit 12-1, is shown in FIG. 3) in order to provide a result E. The result E is relayed directly (thus in uncompressed form) to a server 30, and from there to a finding workstation 20. In parallel with this, the result E is also relayed in uncompressed form to the modality M. In the example shown in FIG. 3, compressed image data respectively from the different compression stages K1, K2, and K3 are transferred serially to a VMware virtual machine (that acts as a processing unit of the processor 12) in a VMware cloud 10. A pipeline to process the acquired image data (of which one pipeline processing stage is the compressor K) can be installed at the modality or at an instance associated with said modality. The same applies to the receiver side. The data decompression is executed within the virtual machine, and the sequentially transferred results of the compression stages K1, K2, and K3 are supplied to the respective CAD algorithm (which is implemented at the processor 12) for localization of the cancer areas. The calculated result E includes a list of segmented lesions that are transferred to the modality M and to a finding workstation 20 for further calculation. In this exemplary embodiment the result data E do not need to be compressed, since they are only a few text-based data. In this exemplary embodiment, the processing unit 12-1 and the decompressor D (with the different decompression stages D1, D2, . . . , Dn) are integrated into the processor 12.

Figure 4:
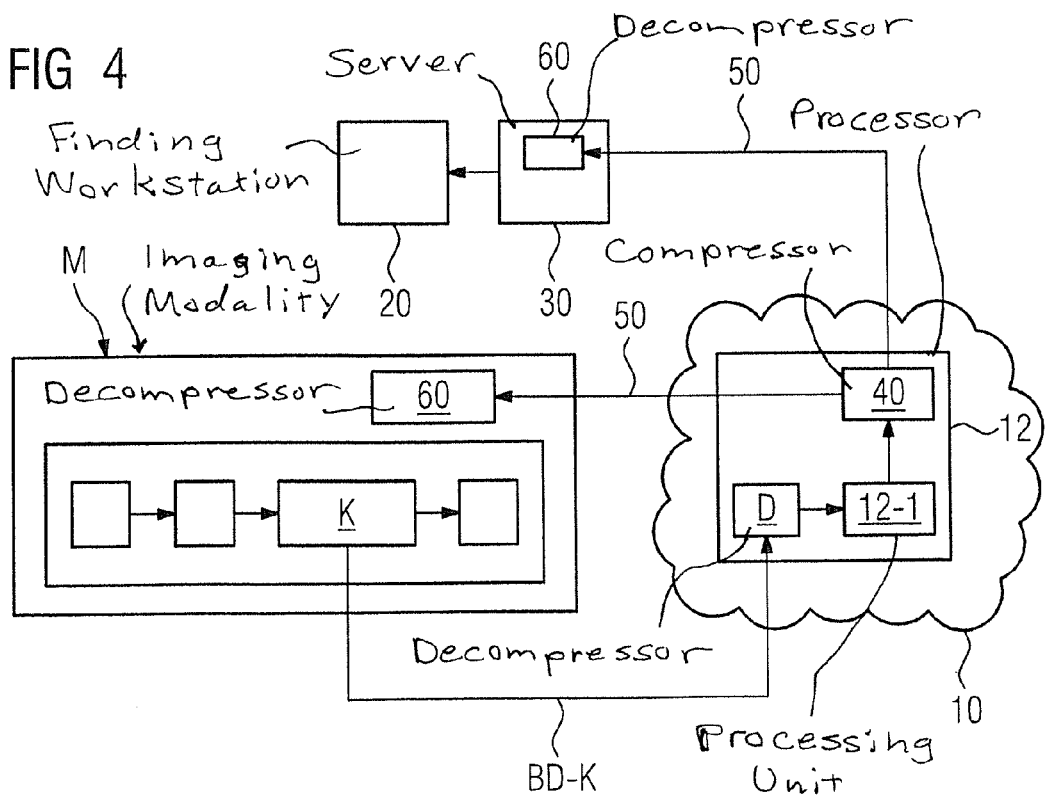
FIG. 4 is a further schematic illustration of the system according to the invention using an exemplary embodiment.

FIG. 4 shows a different exemplary embodiment in which the image data acquired at the modality M are (as already described) compressed and, as compressed image data BD-K, relayed to the cloud system 10. There they are decompressed by the decompressor D and supplied to a processing unit 12-1 of the processor 12. However the data are then not immediately relayed as a result E to additional instances 20, 30; rather, they are in turn supplied to a compressor 40 that is implemented in the processor 12 of the cloud system 10 and serves for compression of the processing result. The processing result 50 that is thus compressed is then transferred to the modality M and/or to the server 30 (in compressed form). So that the server 30 and the modality M can decompress the compressed result data 50, a decompressor 60 is implemented at the server 30, which decompression unit 60 serves to decompress the data. The data that are then decompressed can then be relayed to a finding workstation 20 in uncompressed form. The modality M then likewise has a decompressor 60 in order to also decompress the compressed result 50 here in order to also be able to provide the result data in uncompressed form to the modality M.

As described above, the result data E can thus also be compressed. An incremental compression can thereby also be resorted to. It is likewise possible to configure different compression forms (lossless or lossy) here.

The method is computer-implemented and preferably runs entirely automatically (meaning without any manual interaction by a user) at least for the time period of the data transfer. User settings for configuration can by all means be made in advance. The method can be partially or completely software-based. Moreover, it is possible to embed or, respectively, to integrate the method or, respectively, system as an embedded system into the imaging apparatus or the medical technology system and/or into a control computer (for example within the scope of a central server). The method serves for the storage, processing and relaying of prepared data (in the form of compressed data and result data) to other instances using computer-based technical devices (network). The method therefore also takes into account the conditions of the data processing system in that the available network connections are taken into account for the processing of the image data.

The method is normally computer-implemented. It may be the case that specific method segments are designed as part of a microprocessor solution (and thus are hard-wired), while other segments of the method are designed as software. In this case, only individual segments or portions of the method would be software-implemented. All or selected segments of the method are normally binary-coded or exist in digital form. All or individual segments of the method can be provided as source code, as already compiled code (machine code) or as interpreted code (for example in the interpreter languages Python, PHP, Ruby), or are interpreted by means of an interpreter (for example JIT compiler). For the implementation of the method according to the invention and the additionally claimed products, it is insignificant in what programming language (for example C++, Java, Perl or PHP etc.) the software exists. It is significant that the software is integrated directly into the technical device as part of a technical system, and there serves to control version importation. The parts of the inventive method that are implemented as software can be part of what is known as an "embedded system" that is embedded into the surrounding medical technology system and interacts with this.

In conclusion, it is noted that individual modules and software and hardware modules, and the examination subjects, are in principle to be understood as not limiting with regard to a specific physical realization of the invention. For a person skilled in the art, it is clear that the invention can be realized distributed partially or entirely in software and/or hardware and/or among multiple physical products (also as computer program products).

Although modifications and changes may be suggested by those skilled in the art, it is the intention of the inventor to embody within the patent warranted hereon all changes and modifications as reasonably and properly come within the scope of his contribution to the art.

I claim as my invention:

1. A method to process medical image data acquired at an imaging modality serving as a data source, for transfer to a cloud system for processing at the cloud system, said method comprising:

prior to transferring said medical image data, incrementally compressing said medical image data separately in each of a plurality of compression stages of a compressor, to produce a set of incrementally compressed medical image data from each compression stage;

transferring the sets of incrementally compressed medical image data in parallel from the data source to the cloud system;

in the cloud system, incrementally decompressing the individual sets of incrementally compressed medical image data separately in parallel in each of a plurality of decompression stages of a decompressor, said decompression stages operating respectively with different degrees of decompression so as to produce a plurality of decompressed medical image data sets each having a different degree of compression that remains after said different degrees of decompression;

processing the sets of decompressed medical image data respectively in parallel in different processing units of a processor in the cloud system, thereby generating a plurality of different processed images that differ in visual contact from each other due to the different degrees of decompression of the respective decompressed medical image data sets;

transferring the processing results together from the cloud system to a recipient selected from the group consisting of the data source and an additional computer-based entity; and at said recipient, allowing a display selection to be made among said plurality of different processed images dependent on the respective different visual content of each processed image.

2. A method as claimed in claim 1 comprising transferring the incrementally compressed medical image sets data from the data source to the cloud system via a network having network connection properties, and dynamically adapting the incremental compression of the image data to said network connection properties.

3. A method as claimed in claim 1 comprising incrementally compressing said medical image data with a lossless incremental data compression procedure.

4. A method as claimed in claim 1 comprising incrementally compressing said medical image data with a lossy incremental compression procedure.

5. A method as claimed in claim 1 comprising processing the decompressed medical image data with an incremental processing procedure.

6. A method as claimed in claim 1 comprising processing said decompressed medical image data sets to produce data in said processing results exhibiting a different data type from said medical image data.

7. A method as claimed in claim 6 wherein said medical image data comprise data selected from the group consisting of data representing a list structure, text data, and image section data.

8. A method as claimed in claim 1 comprising transferring said processing results to said additional computer-based entity, and selecting said additional computer-based entity from the group consisting of a diagnostic computerized workstation, the data source and/or a server.

9. A method as claimed in claim 1 comprising executing an image reconstruction algorithm in each of said processing stages to produce, as said processed image, a reconstructed image, with each of said reconstructed images having a different image quality due to said different degrees of decompression of the respective decompressed image data sets.

10. A system to process medical image data acquired at an imaging modality serving as a data source, for transfer to a cloud system for processing at the cloud system, said system comprising:

a computerized data compressor configured to receive said medical image data and, prior to transferring said medical image data, to incrementally compress said image data separately in each of a plurality of processor stages of said compressor, to produce a set of incrementally compressed medical image data from each compression stage;

a transfer unit configured to communicate with a network to transfer the sets of incrementally compressed medical image data in parallel to the cloud system;

a computerized data decompressor in the cloud system configured to incrementally decompress the respective sets of incrementally compressed medical image data separately in parallel in each of a plurality of decompression stages of said decompressor, said decompression stages operating respectively with different degrees of decompression so as to produce a plurality of decompressed medical image data sets each having a different degree of compression that remains after said different degrees of decompression;

a processor in the cloud system configured to process the sets of decompressed medical image data respectively in parallel in different processing units of the processor, thereby generating a plurality of different processed images that differ from each other due to the different degrees of decompression of the respective decompressed medical image data sets;

a transfer unit in the cloud system configured to transfer the processed images together from the cloud system to a recipient selected from the group consisting of the data source and an additional computer-based entity; and said recipient comprising a recipient computer and a display in communication therewith, said recipient computer being configured to allow a display selection to be made among said plurality of different processed images dependent on the respective different visual content of each processed image.

11. A system as claimed in claim 10 wherein each of said processing stages is configured to execute an image reconstruction algorithm to produce, as said processed image, a reconstructed image, with each of said reconstructed images having a different image quality due to said different degrees of decompression of the respective decompressed image data sets.

* * * * *